United States Patent [19]
Borcea et al.

[11] Patent Number: 4,874,194
[45] Date of Patent: Oct. 17, 1989

[54] GRIPPER DEVICE

[76] Inventors: Nicky Borcea, 95 Steep Hill Rd., Weston, Conn. 06883; Alexandru D. Ionescu, 190 Sport Hill Rd., Easton, Conn. 06612

[21] Appl. No.: 212,483

[22] Filed: Jun. 28, 1988

[51] Int. Cl.⁴ .............................................. B25J 15/08
[52] U.S. Cl. ................................... 294/88; 294/119.1; 384/50; 901/37
[58] Field of Search .............. 294/67.33, 81.54, 81.62, 294/88, 103.1, 119.1; 269/202, 227, 285; 279/110, 117; 384/50, 51, 55; 901/31, 36–39

[56] References Cited

U.S. PATENT DOCUMENTS

| | | | |
|---|---|---|---|
| 1,089,362 | 3/1914 | Hannifin | 294/119.1 X |
| 2,330,154 | 9/1943 | Stabinski | 384/55 |
| 2,520,453 | 8/1950 | Burmist | 384/55 |
| 3,221,691 | 12/1965 | Laxo | 384/55 |
| 4,252,358 | 2/1981 | Klebs | 294/119.1 X |
| 4,707,013 | 11/1987 | Vranish et al. | 294/119.1 |
| 4,741,568 | 5/1988 | Borcea et al. | 294/119.1 X |

FOREIGN PATENT DOCUMENTS

| | | | |
|---|---|---|---|
| 1266350 | 5/1961 | France | 384/51 |
| 108316 | 4/1964 | Netherlands | 294/119.1 |

Primary Examiner—Johnny D. Cherry
Attorney, Agent, or Firm—Arthur T. Fattibene

[57] ABSTRACT

A robotic gripper device having a fluid actuated piston actuating a double edged rack with a reciprocal movement. Disposed on opposite sides in meshing relationship with each edge of the rack is a spur gear, and which in turn are disposed in meshing relationship to a corresponding rack carriage; to which a gripper finger is connected. The respective rack carriage is guided along and between spaced apart rail members for movement between operative and inoperative positions. The respective carriages are mounted in rolling engagement to its respective rail member by means of a roller bearing cage and associated rollers to minimize any friction and wear, and to enhance the useful life and accuracy of the gripper device.

2 Claims, 2 Drawing Sheets

GRIPPER DEVICE

This invention relates to a gripper device for use on robotic type machines for gripping, transporting and/or placement of machine parts in an accurate and positive manner.

PROBLEM AND PRIOR ART

The invention relates to gripper devices of a type as disclosed in prior U.S. Pat. 4,593,948 granted June 10, 1986 and to gripper devices as described in U.S. Pat. 4,741,568 granted May 3, 1988; and to improvements in a gripper device of a type disclosed in an application S.N. 06/852,614 filed April 16, 1986 entitled Parallel Motion Gripper, now abandoned. In addition, there have been other known efforts relating to grippers, such as disclosed in U.S. Pat. Nos. 4,544,193; 1,089,362; 900,856; 746,707 and a West German Patent No. 2,254,784 to Brandner. Heretofore, the grippers were slidably mounted on a suitable track for movement between operative and inoperative position. Such slidably mounted grippers are subjected to sliding friction which in a relatively brief period of time results in substantial wear of the relative moving parts that will gradually produce excessive play between the complementary parts. As the play develops, the accuracy of the gripper device is adversely affected. Also, the gripping force of the gripper device is lessened as the parts wear due to the sliding friction to which the parts are subjected.

OBJECTS

An object of this invention is to provide a robotic type gripper having parallel movement grippers mounted on a robotic hand in a manner in which the friction between the relatively movable grippers is reduced to a minimum.

Another object is to produce a gripper assembly subjected to a minimum of friction so as to minimize wear between the complementary movable parts.

Another object is to provide a gripper device that is subjected to a minimum of friction so as to minimize the loss of any gripping force due to wear.

Another object is to provide a gripper assembly that is capable of maintaining its accuracy of operation and gripper power over a considerable period of time.

Another object is to provide a gripper assembly for a robotic hand that has an extended useful life relative to a conventional type gripper of the same size and force.

SUMMARY OF THE INVENTION

The foregoing objects and other features and advantages are attained by a robotic gripper assembly that includes a housing containing a fluid actuated piston for actuating a double edge rack member connected to the piston shaft. Disposed in meshing relationship to the opposed rack edges are a pair of spur gears arranged to counter-rotate relative to each other as the double edge rack member is reciprocated upon the actuation of the piston. Each of the spur gears in turn are disposed in meshing relationship with a rack carriage to effect the movement of the respective rack carriages toward and away from each other as the spur gears are rotated in one direction or the other. Connected to the respective rack carriage is a gripping finger for parallel movement to grip therebetween a workpiece. In accordance with this invention, the respective rack carriages are arranged to ride on roller bearings disposed between the rack carriage and its associated track carried on the housing. This is attained by the track being defined by a pair of opposed rails whereby the adjacent edges of the rails and rack carriages disposed therebetween have complementary surfaces for receiving theretween a roller bearing cage having roller bearings therein so that the rack carriage is disposed in rolling engagement with the opposed track rails.

FEATURES

A feature of the invention resides in the provision of a roller bearing assembly disposed between the guide rails and the rack carriages for effecting a rolling frictional relationship between the rack carriage and its associated guide rails.

Another feature of this invention resides in a relatively simple structure that is positive in operation and simple to assembly.

Other features and advantages will become readily apparent when considered in view of the drawings and following description in which.

DETAILED DESCRIPTION

Figure 1:
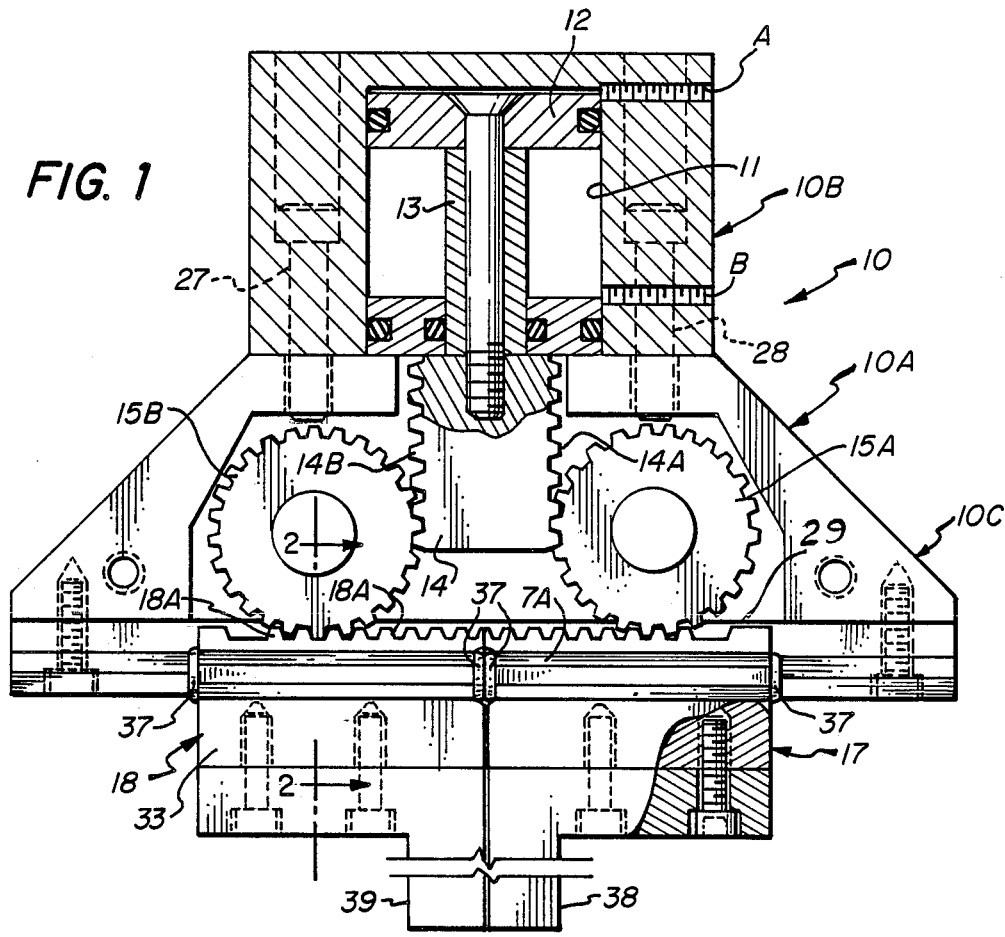
FIG. 1 is a side elevation view showing a section of an embodiment of the invention.

Referring to the drawings, there is shown in FIGS. 1 to 4 a gripper device 10 embodying the present invention. As shown, the gripper device comprises a housing 10A which includes an upper housing portion 10B and a connected lower housing portion 10C. Suitable fasteners or bolts 27, 28 secure the upper housing portion to the lower housing portion. Formed in the upper housing portion is a chamber which defines a cylinder 11 in which a piston 12 is disposed for reciprocable displacement therein. Means are provided for introducing a fluid pressure into the cylinder 11 for effecting the displacement of the piston to operate the device. In the illustrated embodiment, fluid pressure is introduced at a point above and below the piston as at A and B depending upon which direction the piston 12 is desired to be displaced. By alternating the flow of fluid pressure to the cylinder 11, the piston 12 is reciprocally displaced within the cylinder 11.

Connected to the piston is a piston rod 13 which has connected to its free end a double edge rack 14. As shown, the opposed edges 14A and 14B are provided with a series of spaced teeth which are arranged to be disposed in meshing relationship to a spur gear 15A and 15B, respectively, disposed to either side of the double edge rack 14 in the lower housing portion 10C.

The bottom of the lower housing portion is provided with an elongated opening 29.

Figure 2:
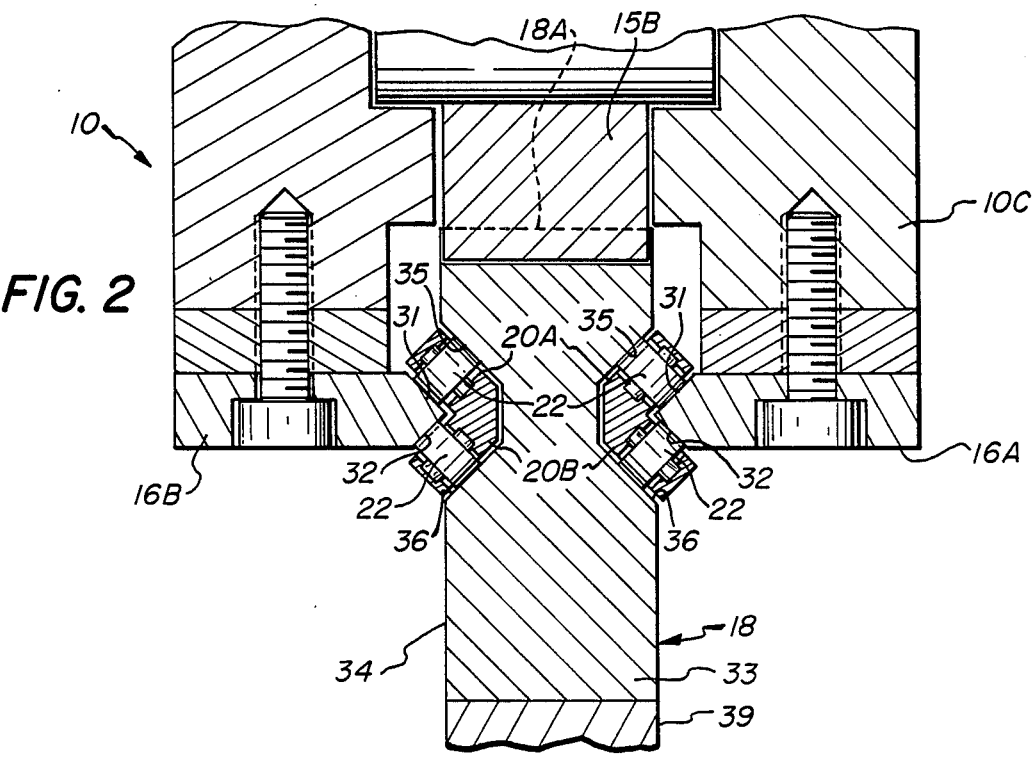
FIG. 2 is a sectional view taken along line 2—2 on FIG. 1.
Figure 4:
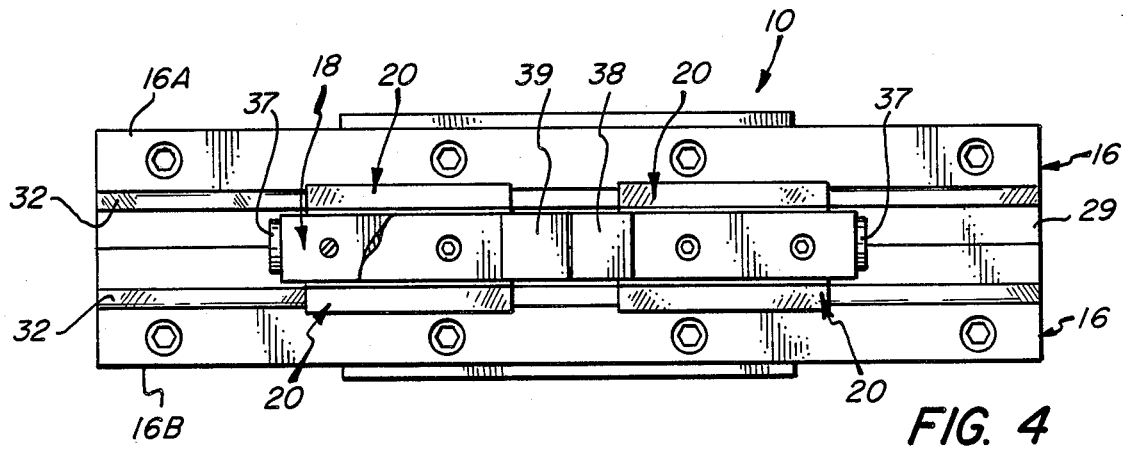
FIG. 4 is a bottom view of FIG. 1.
Figure 3:
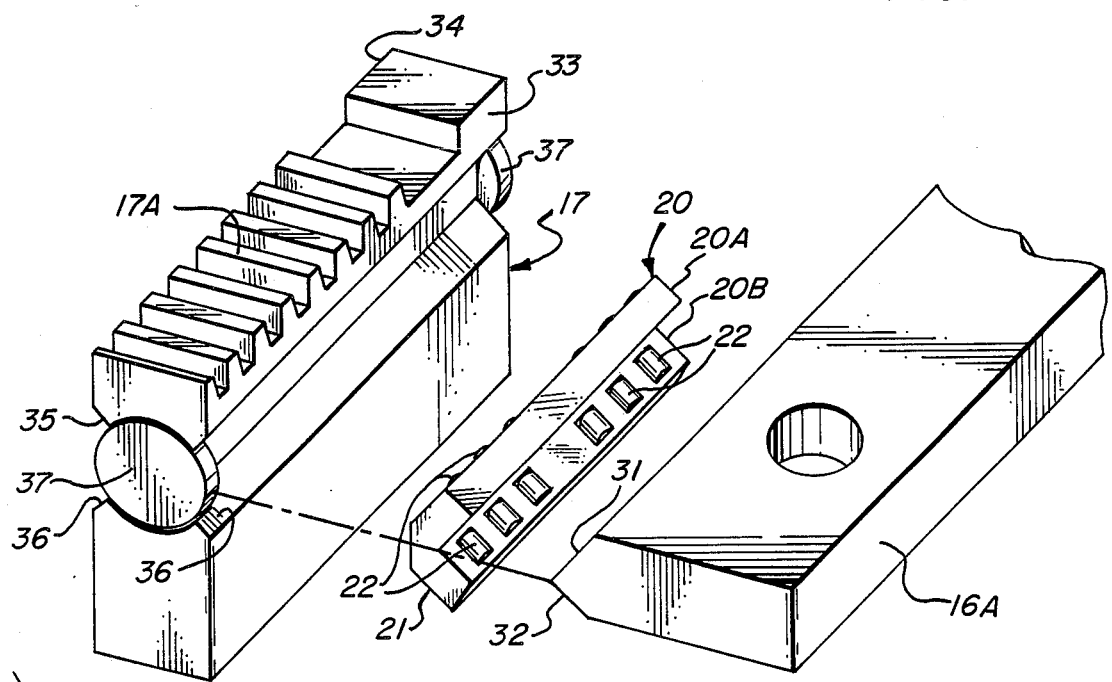
FIG. 3 is an enlarged exploded perspective view illustrating a detail of construction embodying the invention.

Connected to the bottom edge of the lower housing portion is a track means 16 which comprises a pair of oppositely disposed rail members 16A, 16B. As best seen in FIGS. 2 and 3, each rail member 16A, 16B is formed as an elongated member suitably secured to the lower edge of the lower housing portion 10C whereby the inner edges of the rail members are spaced apart to define a guideway for receiving a pair of rack carriages 17 and 18. As shown, each rack carriage 17 and 18 along the upper edge thereof is provided with a rack portion 17A and 18A, which is disposed in meshing relationship with spur gears 15A and 15B, respectively. As best seen in FIG. 3, the respective inner spaced apart edges of the respective rail members are provided with angularly disposed surfaces 31 and 32. Preferably, the angular surfaces 31 and 32 are disposed as a 90° angle relative to one another. However, it will be understood that the angulation of surfaces 31 and 32 may be made at some other desired angle, e.g. 30° or the like.

The opposed side faces 33 and 34 of the respective rack carriages 17 and 18 are each formed with angular complementary surfaces 35 and 36 to complement the angular surfaces of the opposed edges 31-32 of the respective rail members 16A and 16B.

Referring to FIG. 3, a roller bearing means 20 is disposed between the complementary surfaces of the rack carriage and associated rail member so that the respective rack carriages 17, 18 are in rolling engagement with and between the respective rail members 16A, 16B. The roller bearing means comprises a roller cage 21 having angularly disposed side portions 20A and 20B, each having one or more longitudinally spaced apart openings for receiving a roller bearing 22. The arrangement is such that the roller bearing cage 21 with bearings 22 are disposed on either side of the respective rack carriage between the carriage and the adjacent rail member so that each carriage is maintained in rolling engagement on the rail members. As seen in FIG. 3, the opposed ends of the carriages 17 and 18 are provided with end stops 37 to contain the roller bearing means 20 therebetween.

Connected to each of the respective carriages 17 and 18 are the gripper fingers 38 and 39, respectively. The fingers function to grip, transport and place a workpiece during operation of the device 10.

In operation, the piston 20 is displaced within the cylinder by introducing a fluid pressure, e.g. air or liquid pressure to the cylinder 11. On the downward stroke of the piston 20, the double edge rack is lowered causing the spur gears 15A and 15B to oppositely rotate to drive the rack carriages and the fingers carried thereby to move away from each other. Upon the upward stroke of the piston 12, the rack carriage tends to move toward each other causing the fingers 38, 39 to close or grip a workpiece.

In accordance with this invention, the carriages 17 and 18 are in rolling engagement relative to the rail members 16A, 16B. As a result, wear between the carriage and the rail members is minimized, thereby resulting in reducing the amount of any play that would otherwise develop. By reducing the play due to wear, the accuracy and useful life of the gripper device is vastly extended. Also, the gripper force of the respective fingers is maintained at its optimum level over the life of the device 10. Maintaining the gripping force of the gripper device allows the gripper to handle higher pay loads, i.e., heavier or larger parts than the prior slidably mounted grippers of the same size and force. By the elimination of sliding friction between the movable parts, it has been estimated that the lift of the gripper can be increased from 20 to 50 times that of a comparable gripper device which is subjected to a sliding frictional arrangement. With the construction described, the optimum efficiency and accuracy of the device is maintained through out its extended useful life.

While the invention has been described with respect to a particular embodiment thereof, variations and modifications will be readily apparent without departing from the spirit or scope of the invention.

What is claimed is:

1. A robotic gripping device comprising
a housing,
means defining a cylinder included on said housing,
a piston disposed in said cylinder,
a piston rod connected to said piston,
a double edge rack connected to said piston rod,
a spur gear disposed in meshing relationship with each edge of said rack whereby said spur gears are actuated in unison,
a track means connected to said housing defining a guideway,
a pair of rack carriages disposed in said guideway,
each of said rack carriages being in meshing relationship with one of said spur gears,
roller bearing means disposed between said track means and said rack carriages within said guideway,
finger grippers connected to each of said rack carriages for movement toward and away from one another upon actuation of said piston,
said finger grippers being disposed in co-axial alignment,
wherein said track means comprises
a pair of opposed rail members,
said pair of rail members having spaced apart edge portions defining said guideway therebetween,
each of said edge portions having angularly disposed surfaces,
each of said rack carriages having opposed end portions and longitudinal side portions, said side portions, having angularly disposed surfaces complementing the angular surfaces of said rail members and disposed contiguous therewith,
said bearing means being disposed between said complementary angular surfaces of said rail members and said complementing angular surfaces of said rack carriages whereby said rack carriages are disposed in rolling engagement with said rail members,
end stops connected to the opposed end portions of said rack carriages,
said end stops extending laterally of said angular surfaces of said rack carriages, and
said end stops containing said bearing means therebetween whereby said bearing means moves in unison with said rack carriages,
wherein said bearing means comprises an elongated cage having angularly disposed sides, and a plurality of roller bearings maintained in longitudinally spaced relationship on each side of said cage, whereby the roller bearings are disposed in rolling engagement with the corresponding angular surfaces of said rail members and complementary angular surfaces of said rack carriages.

2. A robotic gripper device comprising
a housing having an upper housing portion and a connected lower housing portion, said lower housing portion having a bottom end,
a chamber defining a cylinder disposed in said upper housing portion,
a piston adapted to be reciprocally mounted within said chamber,
means for introducing a fluid pressure within said chamber for effecting the displacement of said piston therein, a piston rod connected to said piston, said piston rod extending toward said lower housing portion, a double edged rack connected to said piston rod, a spur gear rotatably journalled in said lower housing portion on each side of said double edged rack, each of said spur gears being in meshing relationship with a contiguous edge of said double edged rack whereby reciprocable displacement of said piston and double edged rack imparts counter-rotation to said spur gears, a rack carriage disposed in meshing relationship to each of said spur gears whereby the counter-rotation of said spur gears effects relative reciprocable movement of said rack carriages toward and away from one another, a track means including a pair of opposed spaced apart elongated rail members connected to said bottom end of said lower housing portion, said spaced apart rail members defining therebetween a guideway, said rack carriages extending into said guideway, each of said rail members having spaced apart inner edge portions defining said guideway, said inner portions of said rail members having angularly disposed surfaces extending longitudinally thereof, each of said rack carriages having opposed end portions and side portions disposed between said end portions, said side portions formed with angled surfaces for complementing the angular surfaces of a contiguous rail member, bearing means disposed between the complementary angled surfaces of said rail members and rack carriages, said bearing means including a bearing cage having angularly disposed side portions complementing the angled surfaces of said rail members and said rack carriages, roller bearings spaced along the respective side portions of said cage, said bearing cage and roller bearings being disposed between the complementary angled surfaces of said rail members and rack carriages whereby the latter are in rolling engagement with the former, end stops connected to said opposed end portions to extend laterally of said angular surfaces of said rack carriages, said end stops containing said bearing means therebetween whereby said bearing cage and roller bearings move in union with said rack carriages, and a finger gripper connected to each of said rail carriages in co-axial alignment whereby said finger grippers move toward and away from each other as said piston is reciprocably displaced within its cylinder.

* * * * *